United States Patent

Cheng

[11] Patent Number: 5,652,604
[45] Date of Patent: Jul. 29, 1997

[54] HOLLOW TRACK BALL AND METHOD FOR MANUFACTURING SAME

[75] Inventor: Vincent Cheng, Taipei Hsien, Taiwan

[73] Assignee: Primax Electronics, Ltd., Taipei Hsien, Taiwan

[21] Appl. No.: 528,224

[22] Filed: Sep. 14, 1995

[51] Int. Cl.$^6$ .................................................. G09G 5/08
[52] U.S. Cl. .................. 345/167; 345/164; 428/34.1; 428/35.7; 428/192
[58] Field of Search .................. 273/58 B, 58 R, 273/61 R, 217, 233, DIG. 2; 428/192, 119, 120, 35.7, 34.1, 36.92, 194; 345/157, 167, 164; 156/145, 146

[56] References Cited

U.S. PATENT DOCUMENTS

| | | | |
|---|---|---|---|
| 2,706,514 | 4/1955 | Anderson | 273/61 R |
| 4,562,347 | 12/1985 | Horey et al. | 345/167 |
| 4,726,800 | 2/1988 | Kobayashi | 273/58 B |
| 5,018,450 | 5/1991 | Smith | 273/58 H |
| 5,248,961 | 9/1993 | Fujii | 345/167 |
| 5,254,379 | 10/1993 | Kotsiopoulos et al. | 273/58 H |
| 5,457,479 | 10/1995 | Cheng | 345/167 |
| 5,480,155 | 1/1996 | Molitor et al. | 273/58 H |

FOREIGN PATENT DOCUMENTS 9007961  7/1990  WIPO.

*Primary Examiner*—Rena Dye
*Attorney, Agent, or Firm*—Bacon & Thomas

[57] ABSTRACT

The present invention provides a hollow track ball which includes a first hemispherical shell having a first annular end having thereon a plurality of positioning studs, and a second hemispherical shell having a second annular end having thereon a plurality of positioning holes for respectively engaging with the plurality of positioning studs so as to result in a hollow track ball. A method for manufacturing such a track ball includes steps of a) providing a first hemispherical shell having a first annular end having thereon a plurality of positioning studs, and providing a second hemispherical shell having a second annular end having thereon a plurality of positioning holes, and b) causing the plurality of positioning studs and the plurality of positioning holes to engage with each other so as to result the respective hemispherical shells in the hollow track ball. Such a hollow track ball not only avoids the conventional slant joint seam, but also greatly reduces the reject rate of the products.

4 Claims, 2 Drawing Sheets

HOLLOW TRACK BALL AND METHOD FOR MANUFACTURING SAME

FIELD OF THE INVENTION

The present invention relates to a track ball, and more particular to a hollow track ball. The present invention also relates to a method for manufacturing the same.

BACKGROUND OF THE INVENTION

A track ball device is a tool for controlling the movement of the cursor, which includes therein a global object named track ball. A general track ball has a diameter of about 1.5–2.0 cm, which is used in a personal computer for functioning like a traditional mouse device.

As for the video game, the diameter of the track ball generally has a larger diameter to about 10 cm. There are two types of video game track balls, one is a hollow structure and the other is a solid structure.

The solid track ball may not have an appearance of a joint seam, but such a prior solid track ball still encounters a drawback that the entire solid body is made of an Acrylonitrile-Butadiene-Styrene (ABS), which is relatively heavy, not effective in material, and uneasy in operation. While advantages of a hollow track ball are that it is lighter, easy in operation and economical in material.

Previously, a hollow track ball is made by providing two hemispherical sheds and then engaging the two shells by using an ultrasonic wave. But, the respective peripheries of the annular ends of the two shells having a relatively small wad thickness will not exactly align with each other and would accordingly easily result in therebetween a slant joint. As a result, the reject rate of such hollow track ball products as shown in FIG. 1 will be relatively high.

SUMMARY OF THE INVENTION

The object of the present invention is to provide a hollow track ball and a method for swiftly manufacturing the same and reducing the reject rate of such products.

In accordance with the present invention, the method for manufacturing a hollow track ball comprising steps of:

a) providing a first hemispherical shell having a first annular end having thereon a first engaging medium, and providing a second hemispherical shell having a second annular end having thereon a second engaging medium; and b) causing the first and second engaging media to engage with each other so as to result in the hollow track ball.

In accordance with a first aspect of the present invention, both the first hemispherical shell and the second hemispherical shell are made of an Acrylonitrile-Butadiene-Styrene (ABS) material.

In accordance with a second aspect of the present invention, the first and second engaging media are respectively a plurality of positioning studs and a plurality of positioning holes.

In accordance with a third aspect of the present invention, the first hemispherical shell further includes a plurality of positioning holes respectively alternately interposed between the respective positioning studs of the first hemispherical shell and the second hemispherical shell further includes a plurality of positioning studs respectively alternately interposed between the respective positioning holes of the second hemispherical shell.

In accordance with a fourth aspect of the present invention, the first hemispherical shell integrally formed thereto said plurality of positioning studs and the plurality of positioning holes of the first hemispherical shell.

In accordance with a fifth aspect of the present invention, the second hemispherical shell integrally formed thereto the plurality of positioning studs and the plurality of positioning holes of the second hemispherical shell.

In accordance with a sixth aspect of the present invention, the step b) further includes steps of:

b1) dipping the first hemispherical shell and the second hemispherical shell in a solvent so as to partly resolve both the plurality of positioning studs of the first hemispherical shell and the second hemispherical shell; and b2) making the plurality of positioning studs and the plurality of positioning holes of the first hemispherical shell respectively engage with the plurality of positioning holes and the plurality of studs of the second hemispherical shell by using an ultrasonic wave.

In accordance with a seventh aspect of the present invention, the solvent is a resin.

In accordance with an eighth aspect of the present invention, the method further comprising after the step b2) a step of polishing the hollow track ball.

In accordance with the present invention, a hollow track ball comprising:

a first hemispherical shell having a first annular end having thereon a first engaging medium; and a second hemispherical shell having a second annular end having thereon a second engaging medium for engaging with the first engaging medium.

In accordance with a ninth aspect of the present invention, the first and second engaging media are respectively a plurality of positioning studs and a plurality of positioning holes.

In accordance with a tenth aspect of the present invention, the first engaging medium further includes a plurality of positioning holes respectively alternately interposed between the respective positioning studs of the first hemispherical shell, and the second engaging medium further includes a plurality of positioning studs respectively alternately interposed between the respective positioning holes of the second hemispherical shell.

In accordance with an eleventh aspect of the present invention, the first hemispherical shell integrally formed thereto the plurality of positioning studs and the plurality of positioning holes of the first hemispherical shell.

In accordance with a twelfth aspect of the present invention, the second hemispherical shell integrally formed thereto the plurality of positioning studs and the plurality of positioning holes of the second hemispherical shell.

The present invention may best be understood through the following description with reference to the accompanying drawings, in which:

DETAILED DESCRIPTION OF THE PREFERRED EMBODIMENT

Figure 1:
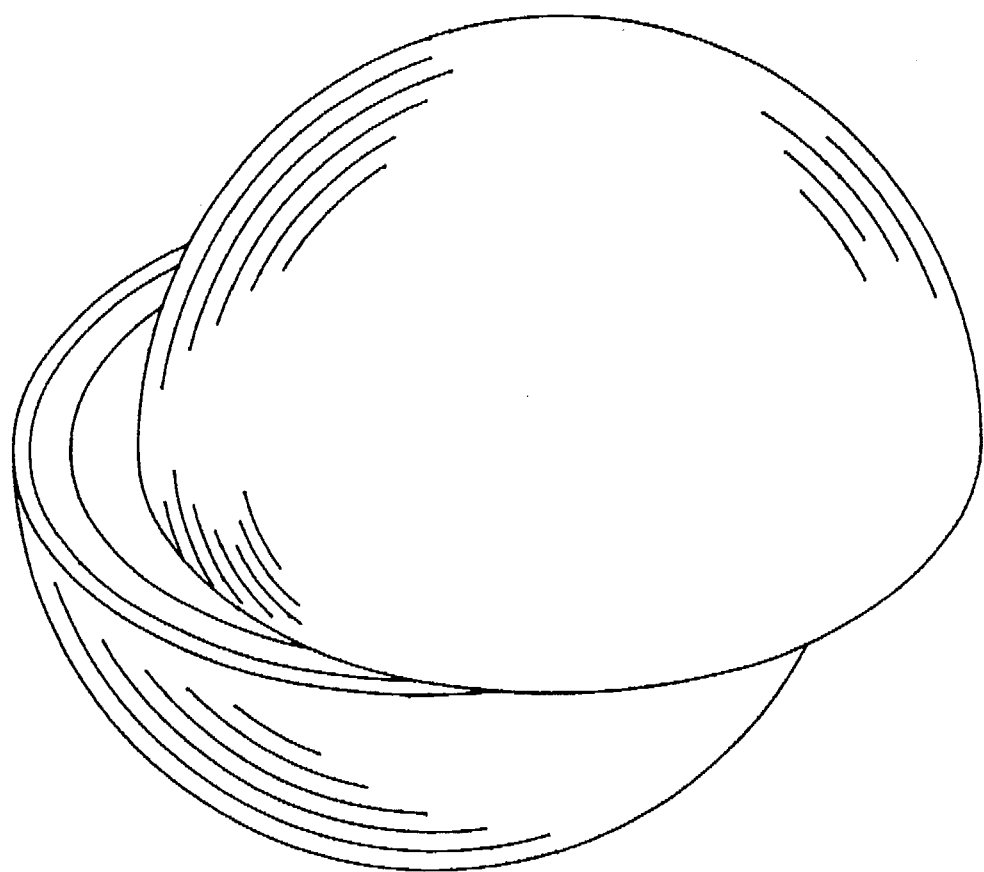
FIG. 1 is a schematic view showing a prior hollow track ball including two hemispherical shells.
Figure 2:
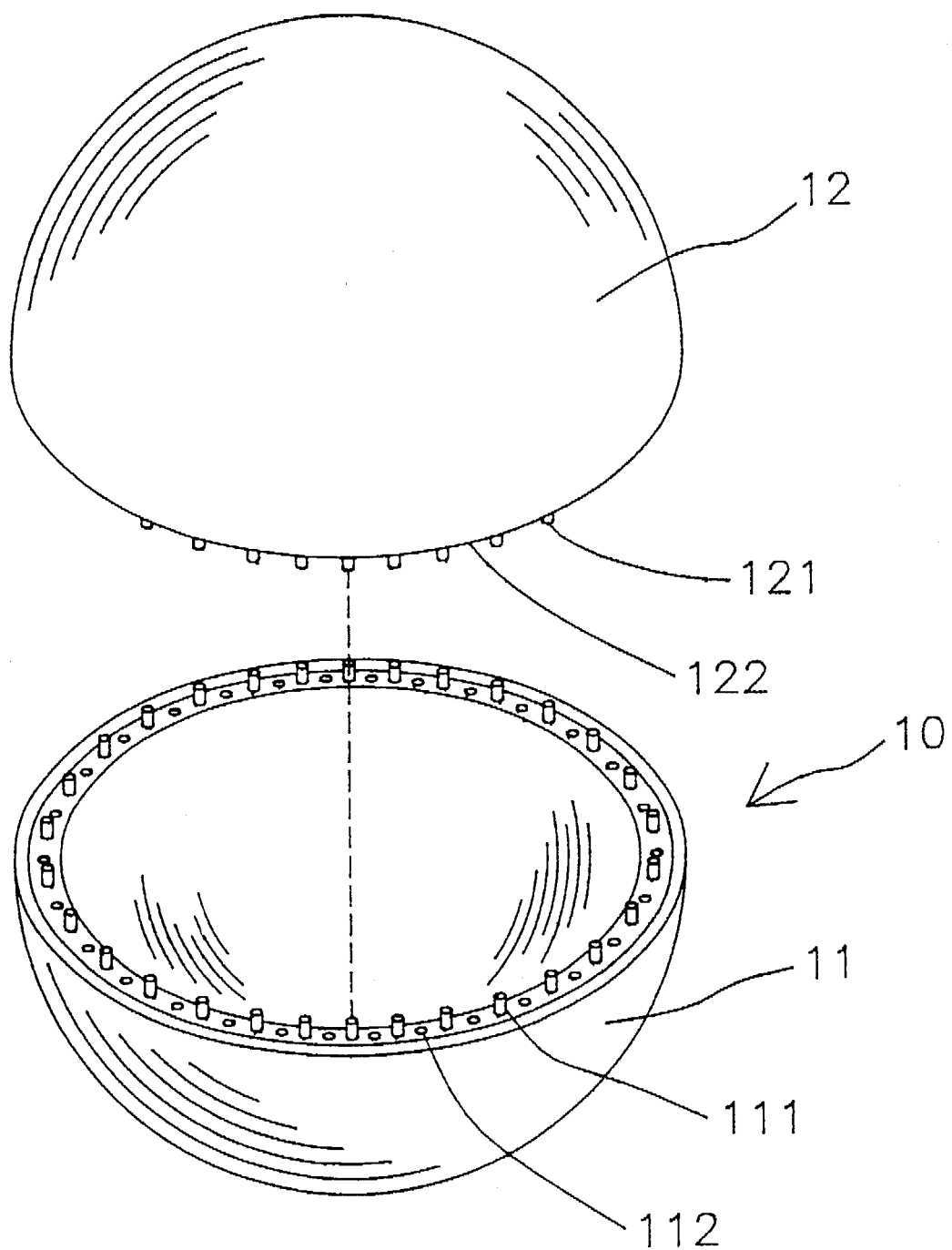
FIG. 2 is a schematic view showing a preferred embodiment of a hollow track ball structure according to the present invention.

Referring to FIG. 2, the present hollow track ball 10 includes a first hemispherical shell 11 having a first annular end having thereon a plurality of positioning studs 111, and a second hemispherical shell 12 having a second annular end having thereon a plurality of positioning holes 122 for respectively engaging with the plurality of positioning studs 111 so as to result in a hollow track ball 10. Preferably, the first hemispherical shell 11 further includes a plurality of positioning holes 112 respectively alternately interposed between the respective positioning studs 111 of the first hemispherical shell 11; and the second hemispherical shell 12 further includes a plurality of positioning studs 121 respectively alternately interposed between the respective positioning holes 122 of the second hemispherical shell 12. Further, the respective positioning studs 111(121) and the positioning holes 112(122) of each hemispherical shell 11(12) are integrally formed to the respective hemispherical shell 11(12).

Also, another preferred embodiment of the present invention is to provide a method for manufacturing a hollow track ball 10, which includes steps as:

1) providing a first hemispherical shell 11 having a first annular end having thereon a plurality of positioning studs 111, and providing a second hemispherical shell 12 having a second annular end having thereon a plurality of positioning holes 122;

2) dipping the first hemispherical shell 11 in a solvent, e.g. a resin (such as Acetone) so as to partly resolve the plurality of positioning studs 111;

3) making the plurality of positioning studs 111 of the first hemispherical shell 11 respectively engage with the plurality of positioning holes 122 of the second hemispherical shell 12 by using an ultrasonic wave;

4) causing the first and second hemispherical shell 11 and 12 to engage with each other so as to result in the hollow track ball 10; and 5) polishing the hollow track ball 10.

From the preferred embodiment above, the present invention engages the respective hemispherical shells of a hollow track ball by using the positioning studs and positioning holes to avoid a slant joint between the shells; besides, since the respective positioning studs and the respective positioning holes of each hemispherical shell are integrally formed to the each hemispherical shell, the manufacturing process of the hollow track ball becomes simple and in turn the product reject rate will be much reduced.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A track ball device for controlling movement of a cursor comprising a track ball wherein said track ball comprises:

a) a first hemispherical shell having a first continuous surface and a first annular end surface with a plurality of locating holes therein; and, b) a second hemispherical shell having a second continuous surface and a second annular end surface with a plurality of discrete positioning studs extending therefrom inseparably attached to the first hemispherical shell such that each positioning stud engages a positioning hole.

2. The track ball device according to claim 1, further comprising a plurality of positioning holes alternately interposed between a plurality of positioning studs on both said first hemispherical shell, and said second hemispherical shell.

3. The track ball device according to claim 2, wherein said first hemispherical shell has integrally formed therewith said plurality of positioning studs and said plurality of positioning holes.

4. The track ball device according to claim 3, wherein said second hemispherical shell has integrally formed therewith said plurality of positioning studs and said plurality of positioning holes.

* * * * *